United States Patent
Loureiro et al.

(10) Patent No.: US 6,934,528 B2
(45) Date of Patent: Aug. 23, 2005

(54) METHOD FOR CREATING SELF-BUILT CUSTOMER HIERARCHIES

(75) Inventors: Rodrigo Ernesto Santos Loureiro, Haymarket, VA (US); Frank Oliver Kruempelmann, Neuss (DE)

(73) Assignee: American Management Systems, Inc., Fairfax, VA (US)

( * ) Notice: Subject to any disclaimer, the term of this patent is extended or adjusted under 35 U.S.C. 154(b) by 531 days.

(21) Appl. No.: 09/739,747

(22) Filed: Dec. 20, 2000

(65) Prior Publication Data

US 2002/0077108 A1 Jun. 20, 2002

(51) Int. Cl.[7] .................. H04M 11/00; H04M 15/06
(52) U.S. Cl. ................ 455/406; 405/407; 405/408; 405/409; 370/114.2; 370/121.02
(58) Field of Search .............................. 455/405–409, 455/418–420, 422.1, 424, 425, 517, 519, 416, 417; 370/261; 379/201.02, 201.03, 201.05, 92.01, 92.02, 92.03, 92.04, 114.01, 121.02–121.06, 126, 127.04, 127.05

(56) References Cited

U.S. PATENT DOCUMENTS

| | | | | |
|---|---|---|---|---|
| 5,797,101 A | * | 8/1998 | Osmani et al. | 455/551 |
| 5,815,807 A | * | 9/1998 | Osmani et al. | 455/410 |
| 5,946,380 A | * | 8/1999 | Cohen et al. | 379/127 |
| 5,995,822 A | * | 11/1999 | Smith et al. | 455/406 |
| 6,122,354 A | * | 9/2000 | Dowens | 379/114.2 |
| 6,272,214 B1 | * | 8/2001 | Jonsson | 379/202 |
| 6,292,657 B1 | * | 9/2001 | Laursen et al. | 455/411 |
| 6,370,374 B1 | * | 4/2002 | Eichinger et al. | 455/411 |
| 6,381,315 B1 | * | 4/2002 | Nhaissi | 379/111 |
| 6,611,501 B1 | * | 8/2003 | Owen et al. | 370/254 |

* cited by examiner

*Primary Examiner*—Nick Corsaro
*Assistant Examiner*—Meless Zewdu
(74) *Attorney, Agent, or Firm*—Staas & Halsey LLP

(57) ABSTRACT

A method for creating customer hierarchies via a network by sending an invitation to one or more customers to join a hierarchy, receiving, from the one or more of the customers, a request to join the hierarchy based upon the invitation, and adding the sender of the request to the hierarchy.

15 Claims, 8 Drawing Sheets

INITIAL RELOAD VALVE = $100

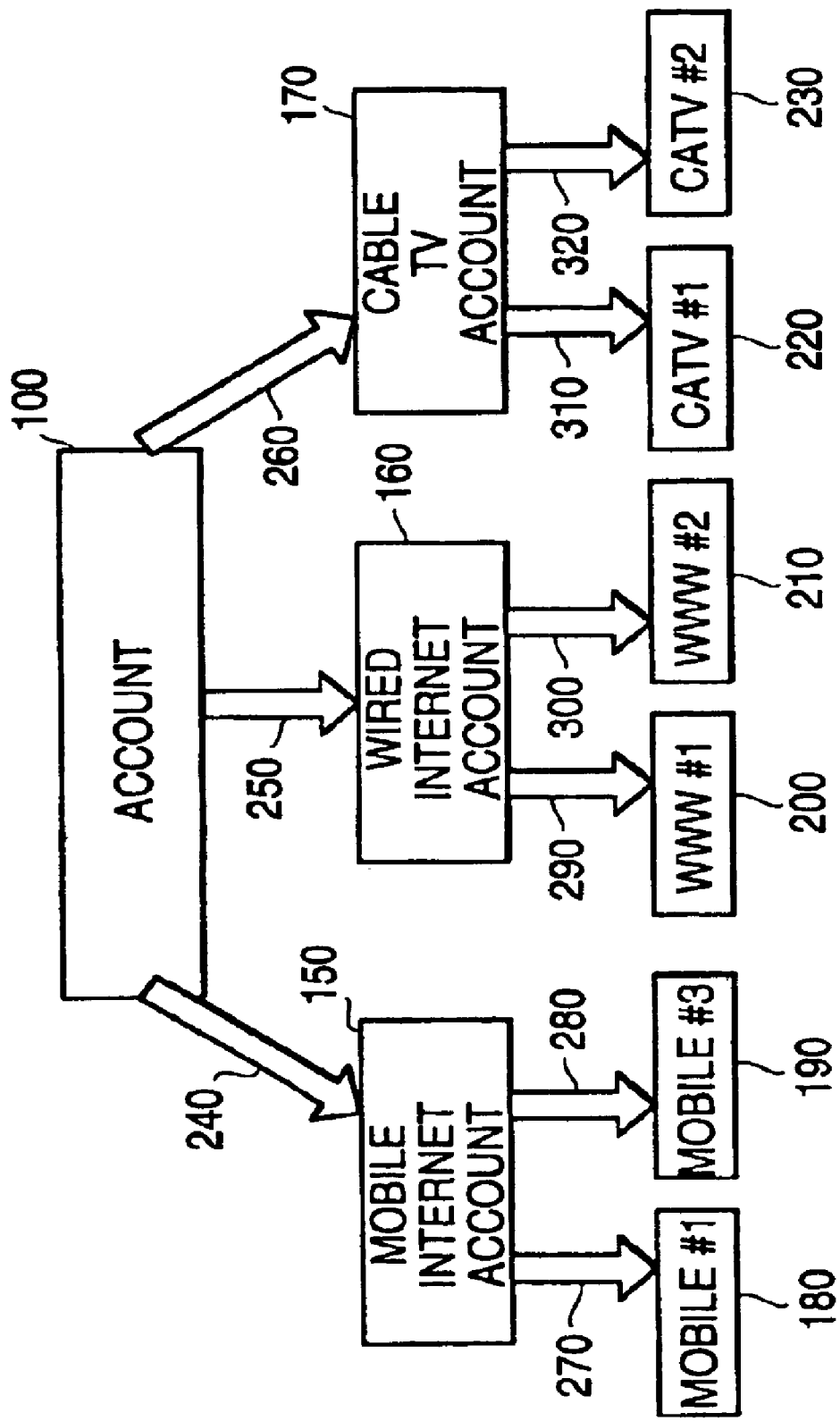

METHOD FOR CREATING SELF-BUILT CUSTOMER HIERARCHIES

BACKGROUND OF THE INVENTION

1. Field of the Invention

The present invention relates to customer hierarchies. More particularly, the present invention relates to a method for creating self-built customer hierarchies over a network wherein an invitation is sent to one or more customers to join a hierarchy. The invitation to join the hierarchy is sent by an originating customer (the hierarchy builder) to another customer. Upon accepting the invitation, a response to the invitation is sent to the hierarchy builder by the other customer, and selected portions of the other customer's hierarchy is added to the hierarchy builder's hierarchy.

2. Description of the Related Art

In the pre-paid calling market, mobile phones are generally sold as a commodity. This is in contrast to traditional contract based mobile phone sales which typically characterize the post-paid calling market. Due to the lack of service contracts within the pre-paid calling market, a user, or customer, of the pre-paid mobile phone can be anonymous to an operator, and thus there is typically no customer support at and after the point of sale of the pre-paid mobile phone. Nevertheless, it would be beneficial if operators were able to offer these customers the possibility of consolidating their mobile phone subscriptions into one account structure, as consolidating their mobile phone subscriptions into one account brings benefits to mobile phone users, such as allowing the users to be able to manage their subscriptions, transfer balances between subscriptions, and reload their pre-paid subscriptions at different levels, for example. In turn, such benefits facilitate a higher level of customer satisfaction, strengthening the customer-operator relationship, and thus lowering customer churn.

Traditionally, however, only post-paid (i.e. contract) customers have benefited from customer hierarchies, which typically have been managed by telecom operators. This is due to how traditional pre-paid mobile phone subscriptions are structured.

For example, FIG. 1 shows the structure of traditional pre-paid mobile phone service accounts and subscriptions for two mobile phones A and B (not shown). A pre-paid mobile telecom service account, mobile phone A pre-paid account 10, is associated with a single pre-paid subscription, mobile phone A pre-paid subscription 20. A monetary balance is stored in mobile phone A pre-paid subscription 20, enabling an initial or continuing use of mobile phone A.

A separate pre-paid mobile telecom service account, mobile phone B pre-paid account 30, is associated with a single pre-paid subscription, mobile phone B subscription 40. A monetary balance is stored in mobile phone subscription 40, enabling an initial or continuing use of mobile phone B. As mobile phones A and B have mutually exclusive subscriptions and accounts, the owners and/or users of mobile phones A and B can not share benefits only available to post-paid customers, such as account consolidation and access to bundled rates or volume discounts given to accounts with multiple subscriptions directly associated with the accounts. Moreover, as it is common for one family, company, or organization to have more than one mobile phone subscription, and as a telecom operator is not aware of the commonly owned multiple subscriptions, the telecom operator can not award the benefits of accumulated usage and other charges to the common owner.

However, even if the telecom operator were aware of the commonly owned multiple subscriptions, traditional post-paid consolidated subscription management is very expensive and involves specially trained telecom operator staff to manage the consolidated subscriptions. Thus, it would be advantageous if the operators could offer to customers the option of consolidating their mobile phone subscriptions into one account structure, which, in turn, would bring benefits to the users by allowing them to be able to manage their balances, transfer their balances between subscriptions, and reload their subscriptions at different levels.

In situations where families or small companies purchase multiple mobile phones, it would further be advantageous for the purchasers to organize their pre-paid mobile phone accounts into a hierarchy for consolidated reporting, budgeting, and payment allocations. However, a problem arises as there is no relationship between the phones themselves, due to the phones typically being purchased at different times and/or at different locations. The purchasers typically have only two options in this situation: the first is to convince a mobile phone customer service center that they own all of the mobile phones, and request that the service center create a hierarchy, and the second is to make do without a hierarchy.

Therefore, a need exists for a method wherein the purchasers or customers can negotiate their own hierarchies with other customers, in order to receive the benefits listed above associated with consolidated accounts and subscriptions.

SUMMARY OF THE INVENTION

It is an object of the present invention to enable customers to create self-built customer hierarchies, at both the account and subscription levels.

Another object of the present invention to enable customers to modify self-built customer hierarchies, at both the account and subscription levels.

A further object of the present invention is to enable customers to create a hierarchy wherein an account manages different types of accounts and subscriptions.

Yet another object of the present invention is to enable the consolidation of post-paid and pre-paid subscriptions and accounts within a customer hierarchy.

Another object of the present invention is to provide a more cost effective way in which to manage customer hierarchies.

The above objects can be attained by a method and system that enables customers to negotiate their own self-built customer hierarchies at both the account and subscription levels. The present invention enables customers to login to a customer self care system, over the Internet or over any other type of network, and provides for the sending of an invitation from an invitation sender to other customers to join the invitation sender's hierarchy. An invitee can then choose to accept or decline the invitation, whereupon the inviter confirms the link between the inviter and invitee.

The invitation can be at the account level or the subscription level. An account level invitation leaves the invited account with full control over its sub-tree of accounts and/or subscriptions, resulting in a multi-account hierarchy. A subscription level invitation moves the subscription of the invitee from the invitee's account to the inviter's account.

At any point in time, any subscription or account can receive an invitation from another customer hierarchy, leave its current customer hierarchy, and join the hierarchy whereupon the invitation originated.

These together with other objects and advantages which will be subsequently apparent, reside in the details of construction and operation as more fully hereinafter described and claimed, reference being had to the accompanying drawings forming a part hereof.

BRIEF DESCRIPTION OF THE DRAWINGS

FIG. 9 shows an account managing different types of accounts and subscriptions according to an embodiment of the present invention.

DESCRIPTION OF THE PREFERRED EMBODIMENTS

Figure 1:
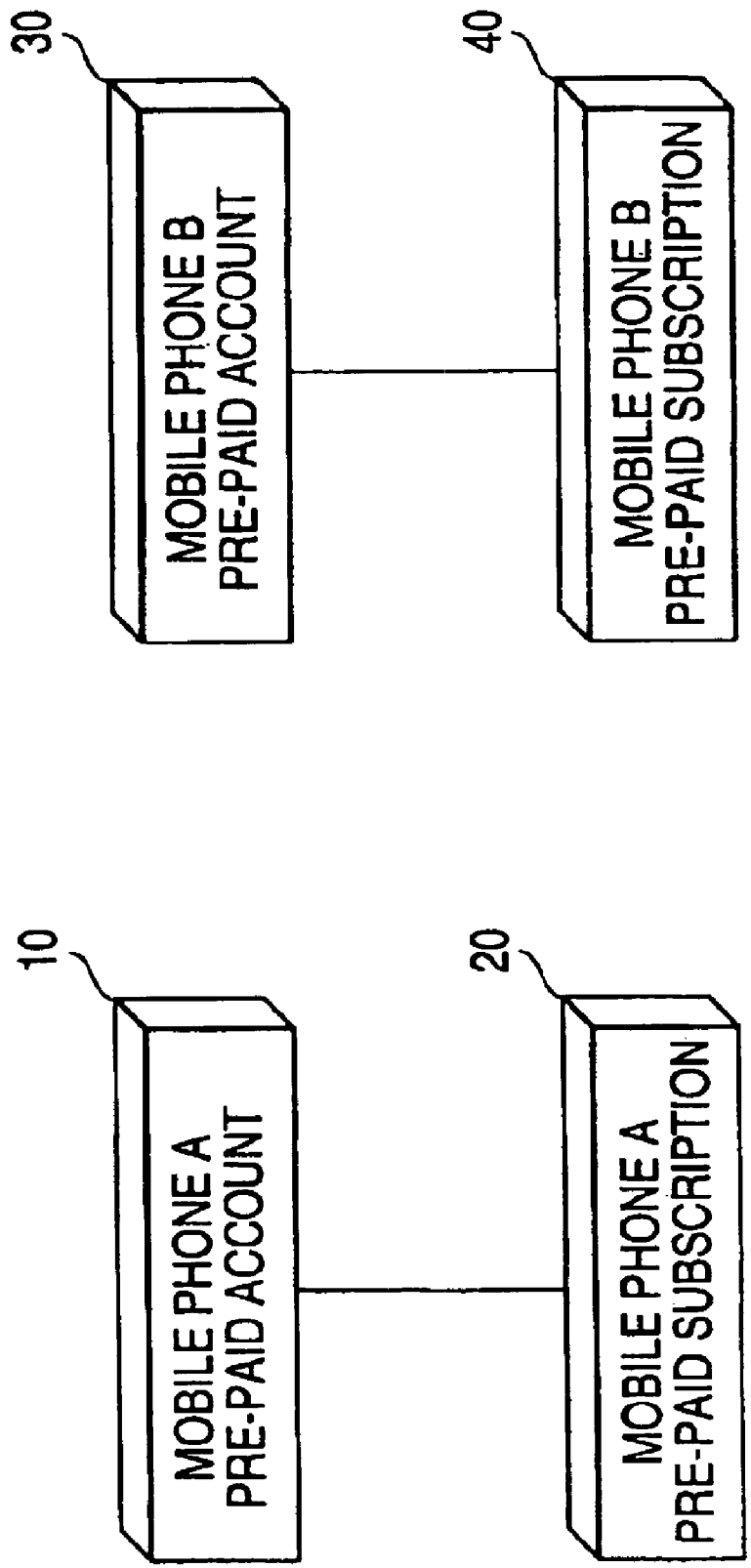
FIG. 1 shows the structure of traditional pre-paid mobile phone service accounts and subscriptions for mobile phones A and B, according to the prior art.

Reference will now be made in detail to the preferred embodiments of the present invention, examples of which are illustrated in the accompanying drawings, wherein like reference numerals refer to like elements throughout.

Figure 2:
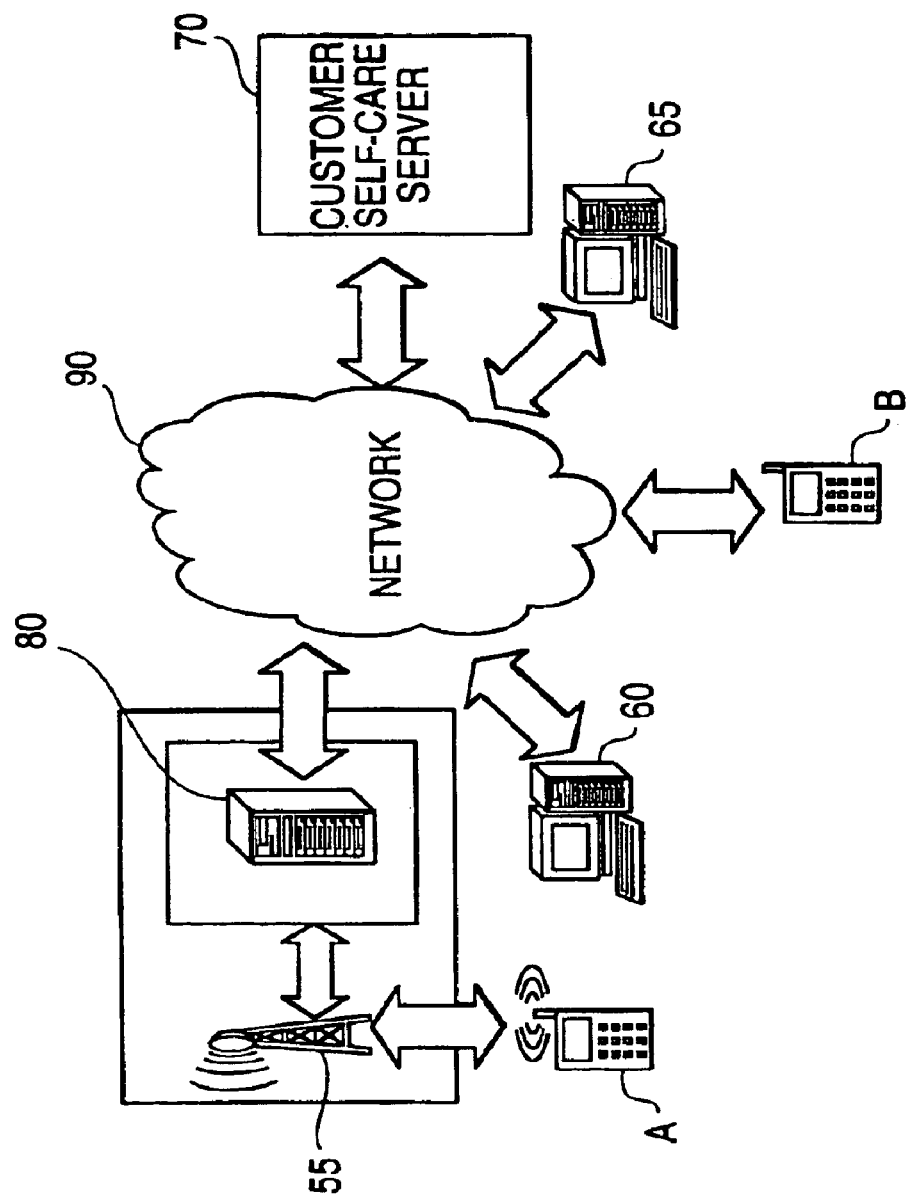
FIG. 2 shows a network system wherein invitations to join a customer self-built customer hierarchy containing accounts and/or subscriptions may be sent, and acceptances to the invitations may be received according to the present invention.

FIG. 2 shows a network system wherein invitations to join a customer self-built customer hierarchy containing accounts and/or subscriptions may be sent, and acceptances to the invitations may be received. A customer, using web-enabled mobile phone A connects and logs into customer self care web server 70, for example, via antenna 55, via WAP gateway server 80, and via network 90. Alternately, a customer may log into customer self care server 70 using computer 60 running network-enabling software via network 90. Such network-enabling software may include, for example, an HTML browser.

The customer (the inviter) may send an invitation in the form of an e-mail or an instant message, for example, to another customer (the invitee) connected to network 90, such as an invitee using web-enabled mobile phone B, or such as an invitee using computer 65 running network-enabling software. Phone B may be connected to network 90 via a palm gateway, an imode gateway, a WAP gateway, or any other type of gateway which allows communication through a network such as network 90. The invitee using phone B or computer 65 will receive a message notifying that there is a message requiring an action. The invitee using phone B or computer 65 may accept or reject the invitation.

The invitation is not limited to being sent over only one type of network. The invitation may be sent over any type of network, such as wired or wireless LANs, WANs, VPNs, and Intranets. For example, the invitation may be sent from mobile phone A to mobile phone B using the Internet, the invitation may be sent from mobile phone A to mobile phone B using an SMS message, as is well known in the art, or the invitation may be sent over a PSTN network using an automated voice system to call the number of mobile phone B and to play a prerecorded invitation message.

The customer using mobile phone B receives the invitation sent by the inviter, and chooses whether or not to accept the invitation to join the inviter's hierarchy. Or, alternately, software running on mobile phone B receives the invitation sent by the inviter, and determines, based on preprogrammed criteria, whether or not to accept the invitation to join the inviter's hierarchy.

Figure 3:
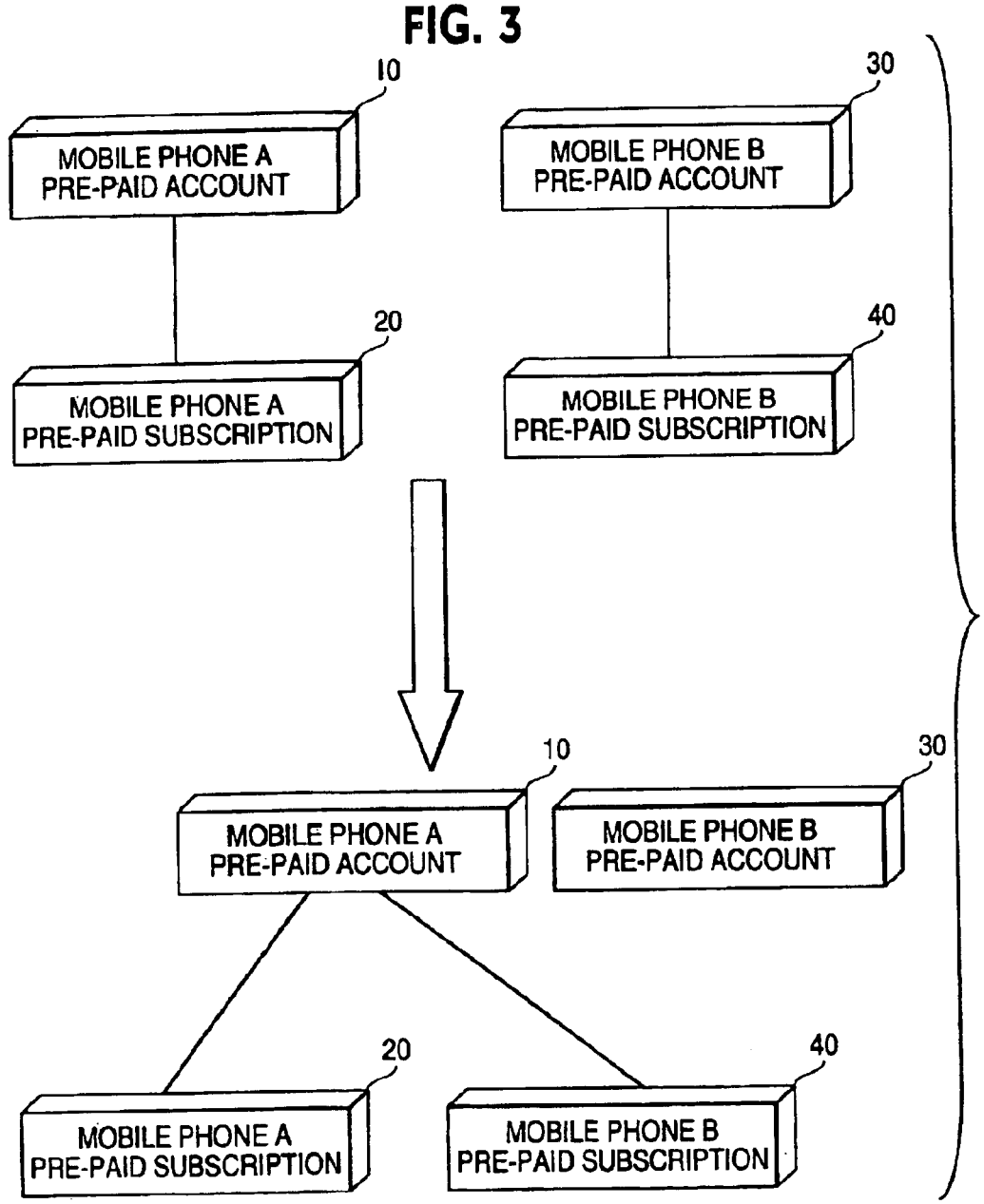
FIG. 3 shows one possible result of consolidating the pre-paid mobile phone subscriptions of FIG. 1 according to the present invention.

For a pre-paid subscription level acceptance, FIG. 3 shows one possible result of consolidating the pre-paid mobile phone subscriptions of FIG. 1 according to the present invention. Using pre-paid account 10 and pre-paid subscription 20 of FIG. 1 as an example of the existing hierarchy of the inviter, (using mobile phone A of FIG. 2, for example) and using pre-paid account 30 and pre-paid account 40 of FIG. 1 as an example of the existing hierarchy of the invitee (using mobile phone B of FIG. 2, for example), FIG. 3 shows the resulting hierarchy of the invitee's acceptance of the inviter's subscription invitation. Mobile phone B pre-paid subscription 40 is transferred from mobile phone B pre-paid account 30 to mobile phone A pre-paid account 10, and mobile phone B pre-paid account 30 is left with no subscriptions. Mobile phone A pre-paid subscription 20 remains unaffected.

Figure 4:
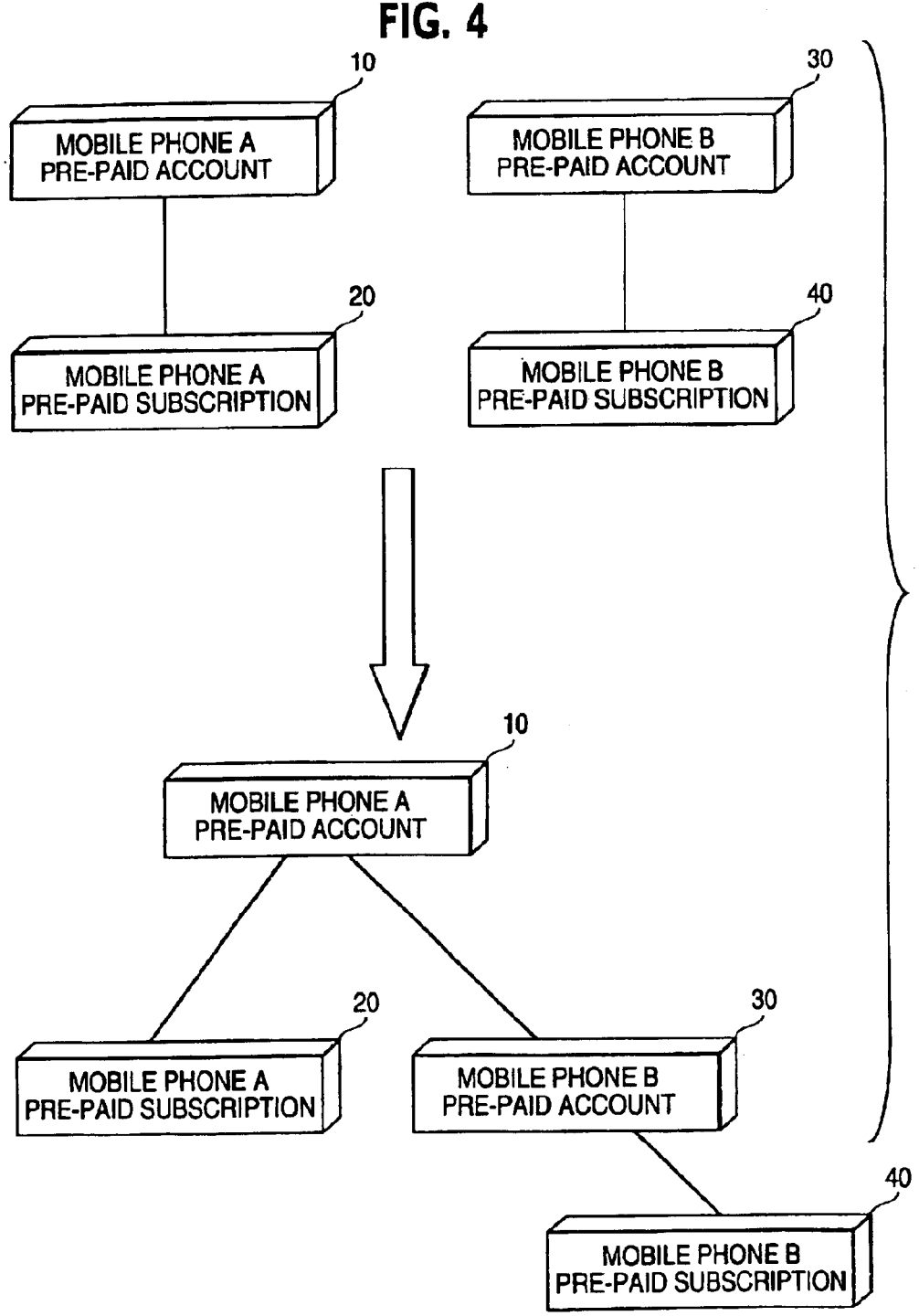
FIG. 4 shows one possible result of consolidating the pre-paid mobile phone accounts of FIG. 1 according to the present invention.

For a pre-paid account level acceptance, FIG. 4 shows one possible result of consolidating the pre-paid mobile phone accounts of FIG. 1 according to the present invention. Using pre-paid account 10 and pre-paid subscription 20 of FIG. 1 as an example of the existing hierarchy of the inviter, (using mobile phone A of FIG. 2, for example) and using pre-paid account 30 and pre-paid account 40 of FIG. 1 as an example of the existing hierarchy of the invitee (using mobile phone B of FIG. 2, for example), FIG. 4 shows the resulting hierarchy of the acceptance of the inviter's account invitation. Mobile phone B pre-paid account 30 becomes a sub-account of mobile phone A pre-paid account 10, with mobile phone B pre-paid subscription 40 intact. Mobile phone A pre-paid subscription 20 remains unaffected.

Figure 5:
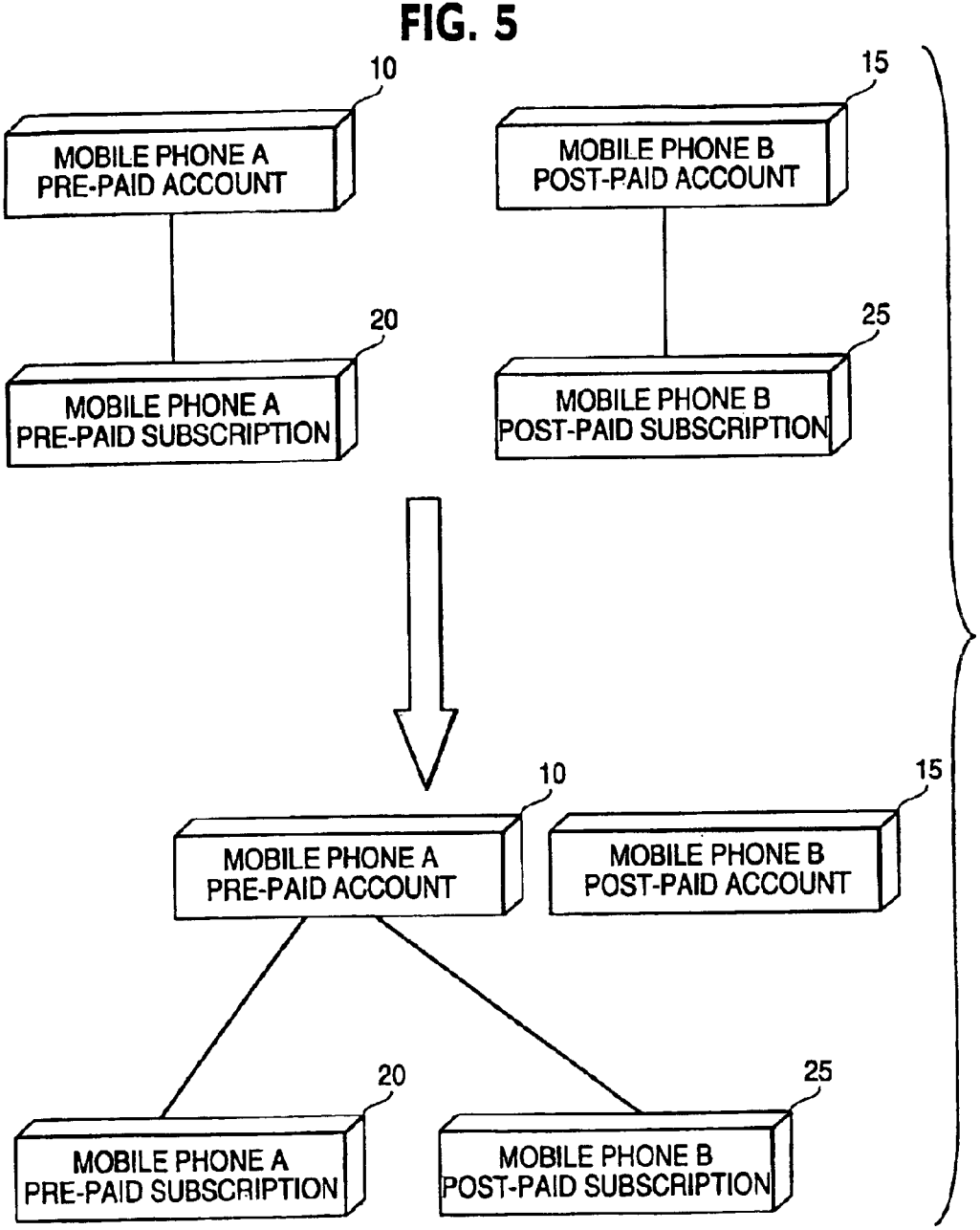
FIG. 5 shows one possible result of consolidating pre-paid and post-paid mobile phone subscriptions according to the present invention.

For a post-paid subscription level acceptance, FIG. 5 shows one possible result of consolidating pre-paid and post-paid mobile phone subscriptions according to the present invention. Using pre-paid account 10 and pre-paid subscription 20 of FIG. 1 as an example of the existing hierarchy of the inviter, (using mobile phone A of FIG. 2, for example) and introducing post-paid account 15 and post-paid account 25 as an example of the existing hierarchy of the invitee (using mobile phone B of FIG. 2, for example), FIG. 5 shows the resulting hierarchy of the invitee's acceptance of the inviter's subscription invitation. Mobile phone B post-paid subscription 25 is transferred from mobile phone B post-paid account 15 to mobile phone A pre-paid account 10, and mobile phone B post-paid account 15 is left with no subscriptions. Mobile phone A pre-paid subscription 20 remains unaffected.

Figure 6:
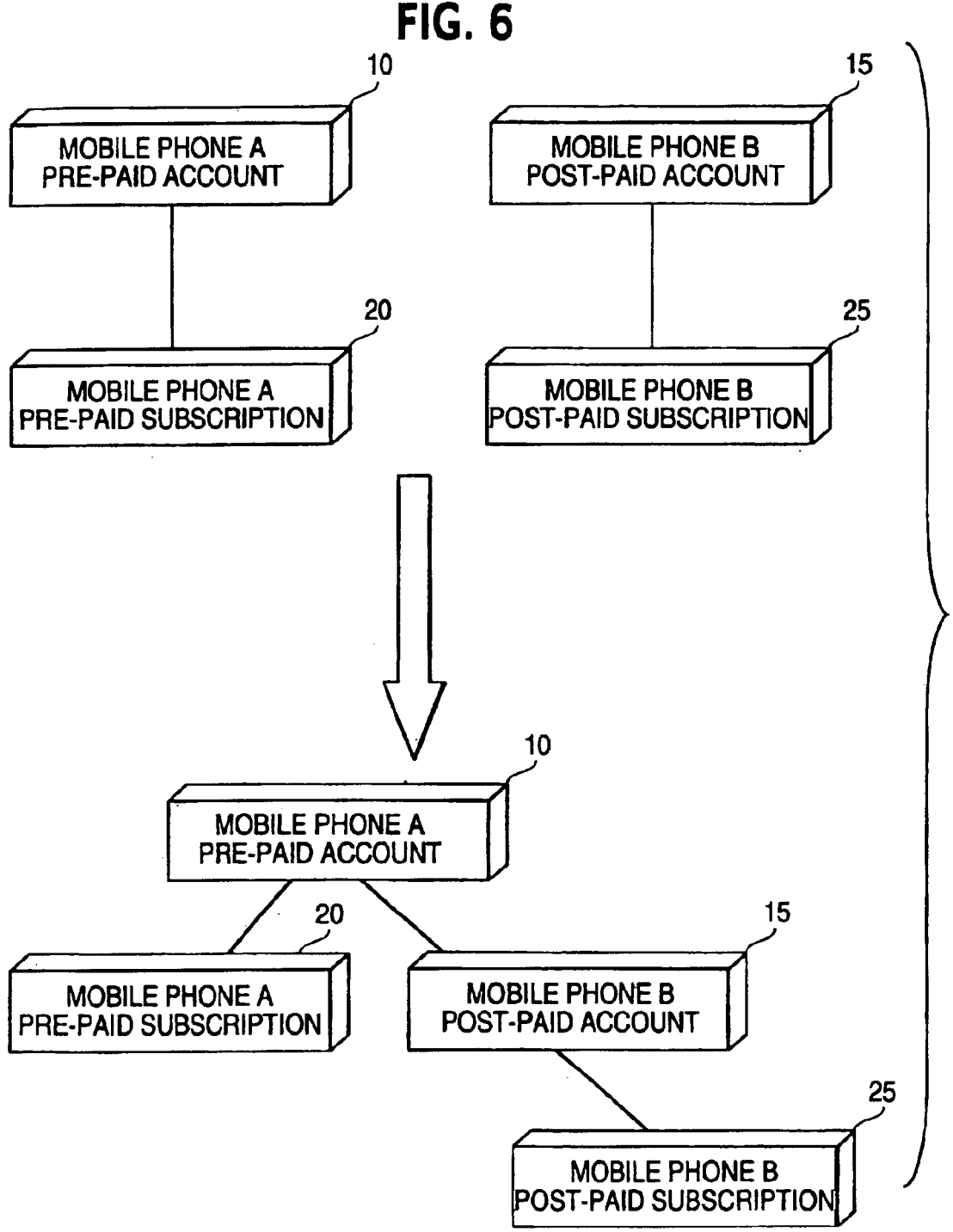
FIG. 6 shows one possible result of consolidating pre-paid and post-paid mobile phone accounts according to the present invention.

For a post-paid account level acceptance, FIG. 6 shows one possible result of consolidating pre-paid and post-paid mobile phone accounts according to the present invention.

Using pre-paid account 10 and pre-paid subscription 20 of FIG. 1 as an example of the existing hierarchy of the inviter, (using mobile phone A of FIG. 2, for example) and using post-paid account 15 and post-paid account 25 of FIG. 5 as an example of the existing hierarchy of the invitee (using mobile phone B of FIG. 2, for example), FIG. 6 shows the resulting hierarchy of the inviter's account invitation. Mobile phone B post-paid account 15 becomes a sub-account of mobile phone A pre-paid account 10, with mobile phone B post-paid subscription 25 remaining intact. Mobile phone A pre-paid subscription 20 remains unaffected.

After the creation or modification of the customer hierarchy is completed, customers may perform account functions on the hierarchy including balance transfers, configurable reload patterns, account value reload, and service value reload.

Figure 7:
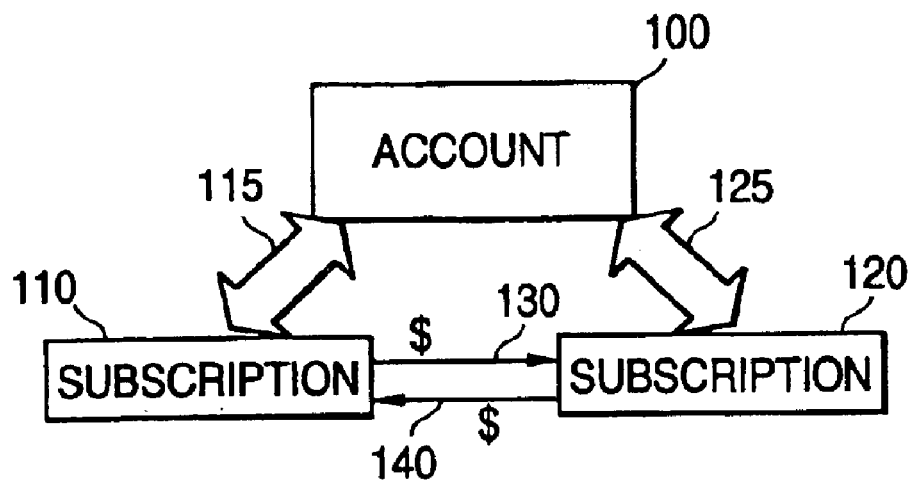
FIG. 7 shows a balance transfer between subscriptions according to an embodiment of the present invention.

FIG. 7 shows a balance transfer between subscriptions according to an embodiment of the present invention. Under this embodiment an account owner or controller may reload the balance of one subscription with funds transferred from another subscription. Account 100 is connected to subscription 110 and subscription 120 via datalinks 115 and 125, respectively. Subscriptions 110 and 120 may be both pre-paid subscriptions, both post-paid subscriptions, or one post-paid and pre-paid. Datalinks 115 and 125 may be any type of communication link or line which has the ability to transmit information, such as an analog telephone line, a digital fiber-optic line, a wireless transmission, or any other type of communications link. Subscriptions 110 and 120 maybe subscriptions for any type of service, mobile phone service or otherwise. An owner or controller of account 100 may withdraw value from subscription 110 via datalink 115 and deposit that same value into subscription 120 via datalink 125, as represented by arrow 130. Alternately, an owner or controller of account 100 may withdraw value from subscription 120 via datalink 125 and deposit that same value into subscription 110 via datalink 115, as represented by arrow 140.

Figure 8:
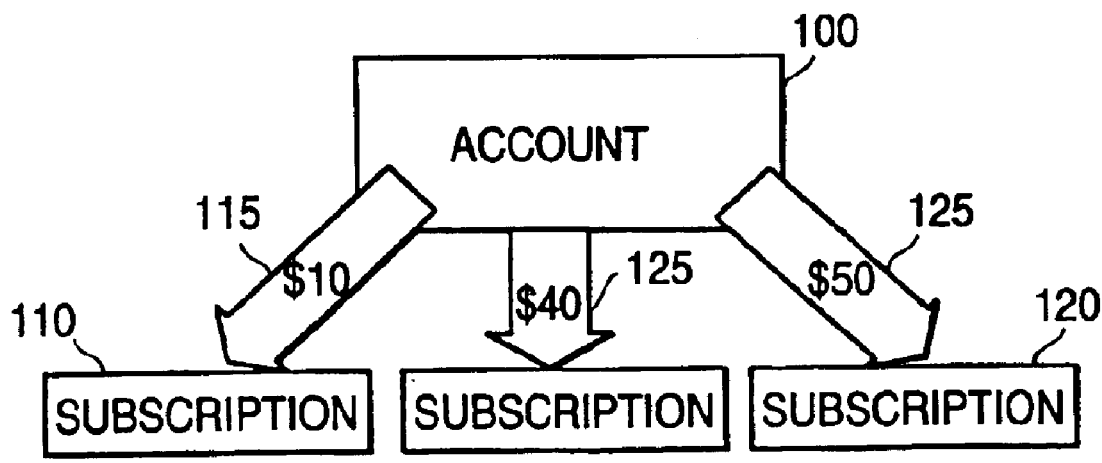
FIG. 8 shows reload patterns according to an embodiment of the present invention.

FIG. 8 shows reload patterns according to an embodiment of the present invention. Under this embodiment, an account owner or user may configure different or identical reload amounts to be transferred to the subscriptions that are associated with the account. Account 100 is connected to subscription 110, subscription 120, and subscription 130 via datalinks 115, 125, and 135, respectively. Datalinks 115, 125, and 135 maybe any type of communication link or line which has the ability to transmit information, such as an analog telephone line, a digital fiber-optic line, a wireless transmission, or any other type of communications link. Subscriptions 110, 120, and 130 may be subscriptions for any type of similar or dissimilar services, and may be any combination of post- and pre-paid subscriptions. For example, subscription 110 may be a subscription for a mobile phone service, while subscription 120 and 130 may be subscriptions for a cable television service; subscription 110 may be a pre-paid subscription, while subscriptions 120 and 130 may be post-paid subscriptions. Account 100 is configured by the account 100 owner or controller to have an initial reload value. Although any reload value may be assigned to the initial reload value, for the sake of clarity, $100 is used in FIG. 8. From the initial reload value, the owner or controller of account 100 next configures the reload percentages of the initial reload value to be sent to subscriptions 110, 120, and 130. For example, the owner or controller of account 100 may apportion 10% of the initial reload value to be sent to subscription 110, 40% of the initial reload value to be sent to subscription 120, and 50% of the initial reload value to be sent to subscription 130, resulting in $10 being transferred to subscription 110, $40 being transferred to subscription 120, and $50 being transferred to subscription 130.

The concept of building self-created customer hierarchies can be applied to a wide variety of markets, not only the pre-paid wireless telecom industry. With the increasing convergence of billing telecom services and the ever expanding product offering of telecom companies, the self-created customer hierarchies can incorporate not only wireless subscriptions, but one account can own or manage different types of subscriptions. In this regard, FIG. 9 shows an account managing different types of accounts and subscriptions. Account 100 may be associated with different types of accounts including, for instance, mobile internet account 150, wired internet account 160, and cable TV account 170. In turn, mobile internet account 150 is associated with mobile internet subscriptions 180 and 190, wired internet account 160 is associated with wired internet subscriptions 200 and 210, and cable TV account 170 is associated with cable TV subscriptions 220 and 230.

Account 100 may add value to sub-accounts 150, 160, and 170 via datalinks 240, 250, and 260, respectively. The value from account 100 may be added to sub-accounts 150, 160, and 170 simultaneously, at different times, and/or using reload patterns as described in the FIG. 8 discussion above, with sub-accounts 150, 160, and 170 replacing subscriptions 110, 120, and 130. Mobile internet account 150 may add value or transfer balances between mobile internet subscriptions 180 and 190 via datalinks 270 and 280, respectively, as described in the FIG. 7 discussion above with account 150 replacing account 100 and subscriptions 180 and 190 replacing subscriptions 110 and 120. Wired internet account 160 may add value or transfer balances between wired internet subscriptions 200 and 210 via datalinks 290 and 300, respectively, as described in the FIG. 7 discussion above with account 160 replacing account 100 and subscriptions 180 and 190 replacing subscriptions 110 and 120. Cable TV account 170 may add value or transfer balances between cable TV subscriptions 200 and 210 via datalinks 310 and 320, respectively, as described in the FIG. 7 discussion above with account 170 replacing account 100 and subscriptions 220 and 230 replacing subscriptions 110 and 120.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for creating telecommunication account/subscription hierarchies via a network, where a telecommunication account/subscription hierarchy is used by an entity owning/controlling the hierarchy to manage telecommunication accounts/subscriptions in the hierarchy, the method comprising:

sending an account/subscription level invitation to one or more entities to join a telecommunication account/subscription hierarchy, where the entitles have respective telecommunication accounts/subscriptions;

receiving, from the one or more of the entities, one or more respective requests to join the telecommunication account/subscription hierarchy based upon the account/subscription level invitation;

adding to the telecommunication accounts/subscription hierarchy one or more telecommunication accounts/subscriptions corresponding to the one or more requests to join the hierarchy; and transferring value between two accounts/subscriptions in the telecommunications account/subscription hierarchy, where one is a pre-paid account/subscription and another is a post-paid account/subscription and where one of the two accounts/subscriptions was added to the telecommunication account/subscription hierarchy by said adding.

2. The method for creating hierarchies via a network according to claim 1, further comprising adding information to die hierarchy, wherein the information comprises a pre-paid account of a sender of the request.

3. The method for creating hierarchies via a network according to claim 1, further comprising adding information to the hierarchy, wherein the information comprise, a post-paid account of the sender of the request.

4. The method for creating hierarchies via a network according to claim 1, further comprising adding information to the hierarchy, wherein the information comprises a pre-paid subscription of the sender of the request.

5. The method for creating hierarchies via a network according to claim 1, further comprising adding information to the hierarchy, wherein the information comprises a post-paid subscription of the sender of the request.

6. The method for creating hierarchies via a network according to claim 1, wherein the invitation is a pre-paid account level invitation.

7. The method for creating hierarchies via a network according to claim 1, wherein the invitation is a post-paid account level invitation.

8. The method for creating hierarchies via a network according to claim 1, wherein the invitation is a pre-paid subscription level invitation.

9. The method for creating hierarchies via a network according to claim 1, wherein die invitation is a post-paid subscription level invitation.

10. The method for creating hierarchies via a network according to claim 1, wherein the entities are users and/or owners of pre-paid or post-paid mobile phones corresponding to accounts/subscriptions.

11. The method for creating hierarchies via a network according to claim 1, wherein the one or more accounts are associated with different types of subscriptions.

12. The method for creating hierarchies via a network according to claim 1, further comprising:

reloading one or more accounts with value from other accounts.

13. A system for creating telecommunication accounts/subscription hierarchies via a network, where a telecommunication account/subscription hierarchy is used by an entity owning/controlling the hierarchy to manage telecommunication accounts/subscriptions in the hierarchy, the method comprising:

means for sending an account/subscription level invitation to one or more entities to join a telecommunication account/subscription hierarchy, where the entities have respective telecommunication account/subscriptions;

means for receiving, from the one or more of the entities, one or more respective requests to join the hierarchy based upon the account/subscription level invitation:

an adding unit adding to the telecommunication account/subscription hierarchy one or more telecommunication accounts/subscriptions corresponding to the one or more requests to join the hierarchy; and a transfer unit transferring value between two or more accounts/subscriptions, where one is a pre-paid account/subscription and another is a post-paid account/subscription, and where one of the two accounts/subscriptions was added to the telecommunication account/subscription hierarchy by said adding unit.

14. A method for creating telecommunication account/subscription hierarchies via a network, where a telecommunication account/subscription hierarchy is used by an entity owning/controlling the hierarchy to manage telecommunication accounts/subscriptions in the hierarchy, comprising:

sending an account level and/or subscription level invitation to one or more mobile phones to join a telecommunication account/subscription hierarchy, where the entities have respective telecommunication accounts/subscriptions;

receiving, from the one or more mobile phones, one or more respective requests to join the telecommunication account/subscription hierarchy based upon the invitation;

adding one or more accounts and/or subscriptions to the telecommunication account/subscription hierarchy, the one or more added accounts and/or subscriptions corresponding to the one or more requests to join the hierarchy;

transferring value between two or more accounts and/or subscriptions added to the telecommunication account/subscription hierarchy and associated with the one or more mobile phones, where one is a pre-paid subscription and another is a post-paid subscription; and reloading one or more subscriptions and/or accounts in the hierarchy with value transferred from other subscriptions and/or accounts in the hierarchy.

15. The method for creating hierarchies via a network according to claim 14, wherein the one or more subscription are subscriptions of different types.

* * * * *

UNITED STATES PATENT AND TRADEMARK OFFICE
CERTIFICATE OF CORRECTION

PATENT NO. : 6,934,528 B2
DATED : August 23, 2005
INVENTOR(S) : Rodrigo Loureiro It is certified that error appears in the above-identified patent and that said Letters Patent is hereby corrected as shown below:

Drawings,
Sheet 7 of 8, FIG. 8, delete "VALVE" and insert -- VALUE --.

Column 4,
Line 15, delete "preprogrammed" and insert -- pre-programmed --.

Column 6,
Line 63, delete "entitles" and insert -- entities --.

Column 7,
Lines 3 and 53, delete "accounts" and insert -- account --.
Line 10, after "subscription" insert -- , --.
Lines 16 and 40, delete "die" and insert -- the --.
Line 20, delete "comprise," and insert -- comprises --.

Column 8,
Line 7, delete "account" and insert -- accounts --.
Line 10, after "invitation" delete ":" and insert -- ; --.
Line 50, delete "subscription" and insert -- subscriptions --.

Signed and Sealed this

Twenty-fifth Day of April, 2006

JON W. DUDAS
*Director of the United States Patent and Trademark Office*